Nov. 20, 1956 A. P. HENDRICKSON ET AL 2,771,595

DATA STORAGE SYSTEM

Filed Dec. 30, 1950 5 Sheets-Sheet 1

INVENTOR.
ARNOLD P. HENDRICKSON
WILLIAM R. KEYE
JOHN H. HOWARD

BY Cushman, Darby & Cushman
ATTORNEYS

Nov. 20, 1956 A. P. HENDRICKSON ET AL 2,771,595

DATA STORAGE SYSTEM

Filed Dec. 30, 1950 5 Sheets-Sheet 2

INVENTOR.
ARNOLD P. HENDRICKSON
WILLIAM R. KEYE
JOHN H. HOWARD

BY Cushman, Darby & Cushman
ATTORNEYS

INVENTOR.
ARNOLD P. HENDRICKSON
WILLIAM R. KEYE
JOHN H. HOWARD

BY Cushman, Darby & Cushman
ATTORNEYS

INVENTOR.
ARNOLD P. HENDRICKSON
WILLIAM R. KEYE
JOHN H. HOWARD
BY Cushman, Darby & Cushman
ATTORNEYS Nov. 20, 1956 A. P. HENDRICKSON ET AL 2,771,595

DATA STORAGE SYSTEM

Filed Dec. 30, 1950 5 Sheets-Sheet 5

INVENTOR.
ARNOLD P. HENDRICKSON
WILLIAM R. KEYE
JOHN H. HOWARD

BY Cushman, Darby & Cushman
ATTORNEYS

United States Patent Office 2,771,595

Patented Nov. 20, 1956

2,771,595

DATA STORAGE SYSTEM

Arnold P. Hendrickson, Minneapolis, and William R. Keye, St. Paul, Minn., and John H. Howard, Springfield, Pa., assignors, by mesne assignments, to Sperry Rand Corporation, New York, N. Y., a corporation of Delaware Application December 30, 1950, Serial No. 203,612

1 Claim. (Cl. 340—174)

This invention relates to methods and apparatus for storing information, and particularly to the rapid recording, locating, reading and altering of information.

Various techniques for the storage and subsequent locating, reading and removing or altering of magnetic flux indicia in cells or areas on a magnetizable record medium are described in the following copending patent applications: Application of John M. Coombs and Charles B. Tompkins, filed March 25, 1948, for Data Storage Apparatus, Serial No. 16,997, now United States Patent 2,617,705; application of Arnold A. Cohen, William R. Keye, and Charles B. Tompkins, for Data Storage Systems, filed March 25, 1948, Serial No. 16,998, now Patent No. 2,540,654; application of John M. Coombs, for Data Storage Apparatus Controls, filed May 2, 1949, Serial No. 90,941, and application of Arnold A. Cohen, John L. Hill, and Robert M. Kalb, for Storage and Relay System, filed July 24, 1950, Serial No. 175,832, now United States Patent 2,614,169. In these applications, and particularly in Coombs et al., Serial No. 16,997, and Cohen et al., Serial No. 16,998, it has been disclosed that a magnetizable medium such as magnetizable tape, may be bonded to the periphery of a cylindrical drum mounted for rotation about a central axis. Magnetic transducing heads would be positioned closely adjacent but out of contact with the surface of the drum, and indicia consisting of spots of magnetic flux may be induced in cells or areas along tracks of the magnetic tape as the drum is rotated either step-by-step or by continuous movement. Also, by the arrangements of the applications, the spots or indicia of magnetic flux can be read and altered by the same or other transducers positioned adjacent the "tracks" swept by the recording transducers.

In techniques such as those described above, a binary system of notation can be employed. That is, each indicia or spot of flux on the drum may be in one of two directions. The usual orientation is to have the binary flux lines parallel to the path of motion of the magnetizable medium, and either in the direction of motion, or opposite to the direction of motion. However, it is possible to have the flux transverse to the path of movement and in one direction or other, or, in general, to have two different configurations.

It is also explained in the above-mentioned applications, and particularly in Cohen et al., Serial No. 16,998, how a series of flux notations of the same character may be blended into one another to form a continuous flux field in one direction. This has been referred to as non-return-to-zero recording. However, a so-called return-to-zero recording may be employed, wherein the spots of flux are discrete even if a series of spots along a track happen to be of the same character.

For convenience in terminology, an indicium or flux spot of one direction is thought of as a 0 (zero), and an indicium having flux in the other direction is thought of as a 1. This is a typical binary notation.

It is apparent from the above that a magnetizable storage apparatus comprising a rotatable drum and associated circuits is a very useful component of high speed calculating machines and the like. Unlike many other systems for storage of information, such as electrostatic or cathode ray tube arrangements, a magnetizable storage system combines all of the very important features of (1) ease of recording, (2) efficient reading, (3) permanence, (4) alterability, and (5) rapid access time.

As is indicated in the above-mentioned patent applications, any binary indicium in a cell may be easily transformed into a binary indicium of the opposite character by writing the newly desired character over the previous one. Since saturation techniques are employed, the writing of flux in the opposite direction in a cell has the effect of not only erasing the previous flux, but establishing the opposite flux. Accordingly, it is not necessary to first erase a flux and then subsequently write the new flux. This technique has been termed "selective alteration."

It will be understood that a magnetizable drum is not necessary under all circumstances. That is, under some conditions, the same techniques may be employed with a magnetizable tape running between reels or a continuous magnetizable tape running over aligned pulleys.

The present invention deals with methods and apparatus for locating specific cells or areas on a drum or other storage or record medium for either a recording, reading, or selective alteration operation. By the arrangement hereinafter described, two or more address or locator tracks have permanently recorded therein an arrangement of binary indicia, and transducing heads scanning these tracks produce an output pulse only when the binary indicia of the tracks agree with an address established on an associated register.

Accordingly, an object of this invention is to provide methods and apparatus for locating a specified area or cell on the surface of a moving record member.

A further object of this invention is to provide method and apparatus for locating a specified area or cell on a moving record member and for enabling a transducing operation between such specified area or cell of the record member and associated circuits.

Further objects and advantages of the invention will be apparent from the following description and accompanying drawings.

In the drawings, Figure 1 is a diagrammatic layout of the invention.

Figure 1:
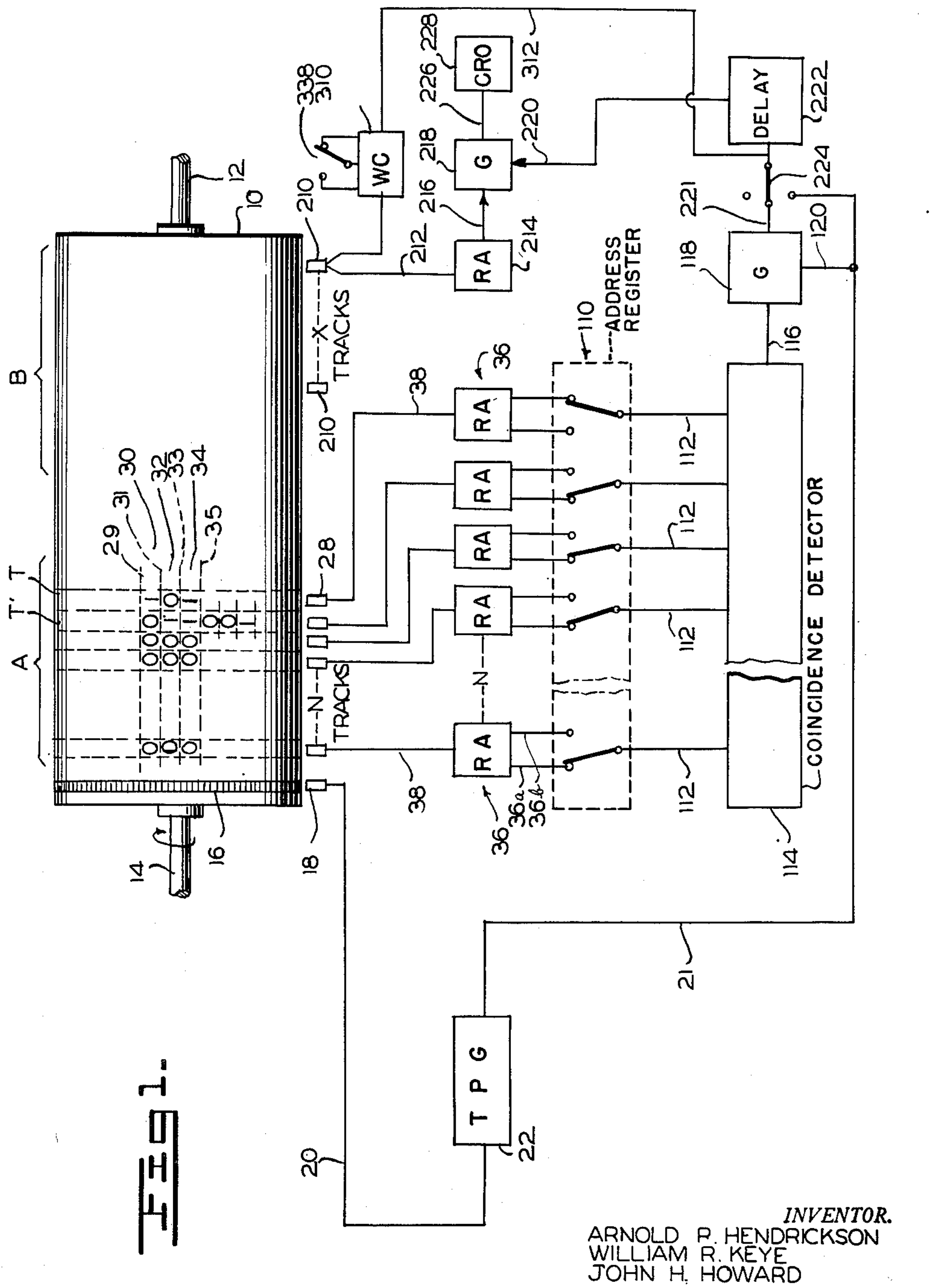

Referring now to Figure 1, the numeral 10 designates a movable record member comprising a drum having a magnetizable surface. Drum 10 may be mounted in suitable bearings by means of the protruding shaft extensions 12 and 14. The drum may be similar to the drums described in the above-mentioned patent applications except that it may be additionally equipped with a timing track 16, which may be formed of a soft iron ring having transverse grooves milled therein. The characteristics of timing track 16 are described below, but it will be understood that instead of the ring, a magnetizable track may be used having a series of timing pulses recorded therein.

For purposes of illustration, drum 10 is indicated as generally divided into two sections, one section A being devoted to address indicia carrying a locator tracks used in the cell locating operation, and the other section B being used to carry digital indicia or signals relating to whatever information is stored on the drum.

As is the case in the systems of the above-mentioned applications, the specific digital indicium cells contained in the tracks of section B of the drum may be established by the timing track 16. The magnetic transducer or head 18 comprises a scanning device which scans track 16 and will produce on a line 20 a voltage in the form of a continuous wave which may be of substantially sine form, though such wave form is not a strict requirement. Line 20 serves as the input to a timing pulse generator 22 which has the function of generating a series of sharply defined unidirectional clock pulses. There may be one clock pulse for each wave of the signal on line 20, or generator 22 may multiply the frequency of the signals delivered by line 20 so that a predetermined number of clock pulses is produced for each signal delivered by line 20.

Figure 2:
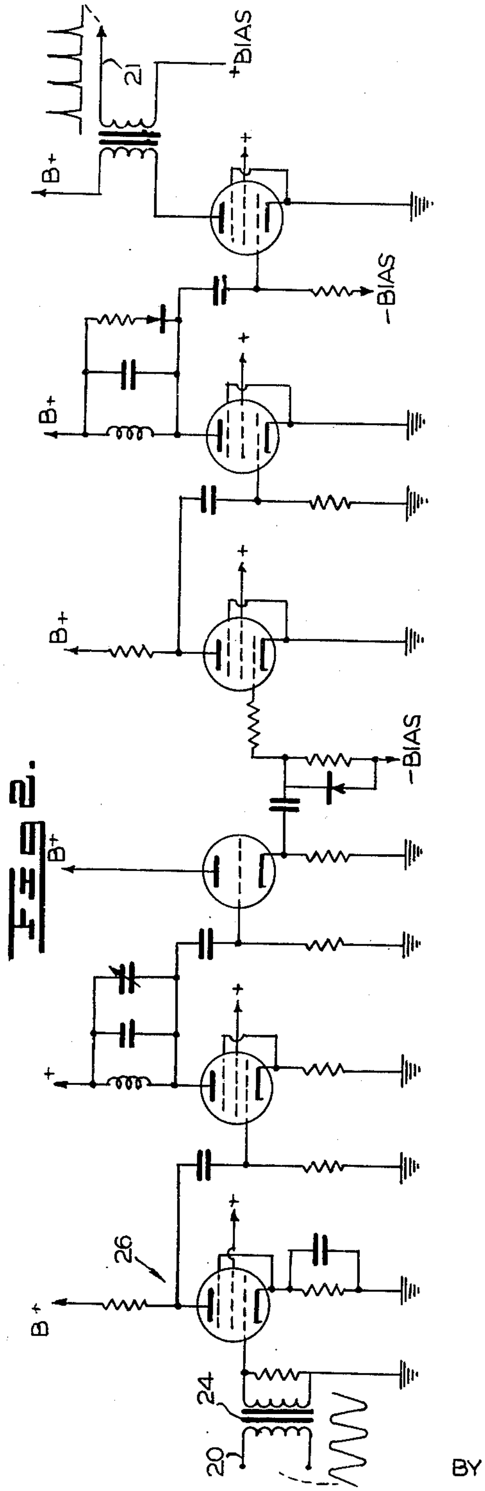
Figure 2 shows a clock pulse forming circuit employed in the invention.

Those skilled in the art will be aware that there are any number of suitable circuits which are available for use as element 22, i. e., to transform a sine wave or the like into a series of sharply defined clock pulses which are equal to or are an exact multiple of the waves on line 20. However, a specific example of such a circuit is shown in Figure 2. In this figure, line 20 is shown as the input to a transformer 24 which supplies a voltage to an amplifying section generally designated 26. The wave form on line 20 is indicated in Figure 2 immediately below the transformer. From the amplifying section 26, the amplified wave is fed through a series of forming sections, the nature of which are clear from the drawing. The form of the output clock pulses is indicated at the end of the Figure 2 circuit, where they are applied to a line 21.

Referring again to Figure 1, section A of drum 10 is formed of a plurality of address or locator tracks. These tracks are swept out by a plurality of locator scanning devices indicated generally as 28. As shown in the figure, there may be N tracks, the actual number of tracks being controlled by the number of cells or locations which it is possible to establish on the periphery of the drum in each of the tracks. As is brought out in the above-mentioned patent applications, over 2,000 cells may be provided in a track extending about the periphery of a drum of practicable size. Accordingly, each cell of each locator track in section A is adapted to carry one of the necessary binary marks to make up a total of 2,000 binary addresses, or whatever the number of cells per track may be. Therefore, the number of locator tracks in section A is determined according to this requirement.

In greater detail, it will be assumed, for the sake of explanation, that each of the N tracks of section A of drum 10 contains a plurality of cells which previously have been recorded and which extend circumferentially about the drum, and that the transversely or axially aligned cells of adjacent tracks form a row bearing a binary number representative of the address of that particular row or element of the drum surface. To make this clear, there has been superimposed upon the showing of the drum in Figure 1 a plurality of tracks indicated as separated from each other by the vertically extending dash lines. Rows of cells also have been bounded by dash lines 29, 31, 33 and 35 extending horizontally of the figure, viz., parallel to the axis of the drum. These intersecting dash lines thus form squares, and each square may be considered as bounding the outline of an otherwise invisible cell or area on the drum surface. For example, the uppermost row of squares, designated generally as row 30, is shown as bearing flux spots representing the binary number 0—0001 (reading from left to right in Figure 1). Line 31 separates row 30 from the next lower row or element 32, which is indicated as carrying the binary number 0—0010. The next row 34 carries the binary number 0—0011. It will be observed that each successive row is illustrated as carrying an address number which is different by one in a binary counting system, and the rows or elements such as 30, 32 and 34 may contain, in order, 2,000 binary addresses (though this number will vary with the diameter of the drum). A sufficient number of tracks will be provided in section A so that $2^N$ addresses will be equal to or more than the number of cells which the circumference of the drum can accommodate.

In operation, it will be appreciated that after the drum has rotated substantially 270° from the position shown in Figure 1, the row or element 30 will come opposite the address transducers 28. When this occurs, the output voltages of these transducers will be an indication of the particular binary notation in the cells of row 30. These voltages derived from the transducers 28 are applied to the input of N reading amplifiers, designated generally as 36. Each of these amplifiers performs the function of supplying an output on two lines, 36a and 36b, indicating whether it is a 0 or a 1 which is passing beneath the transducing head 28 to which the particular amplifier 36 is connected. The connection between the transducers 28 and the amplifiers 36 is by lines 38.

Figures 3, 3A:
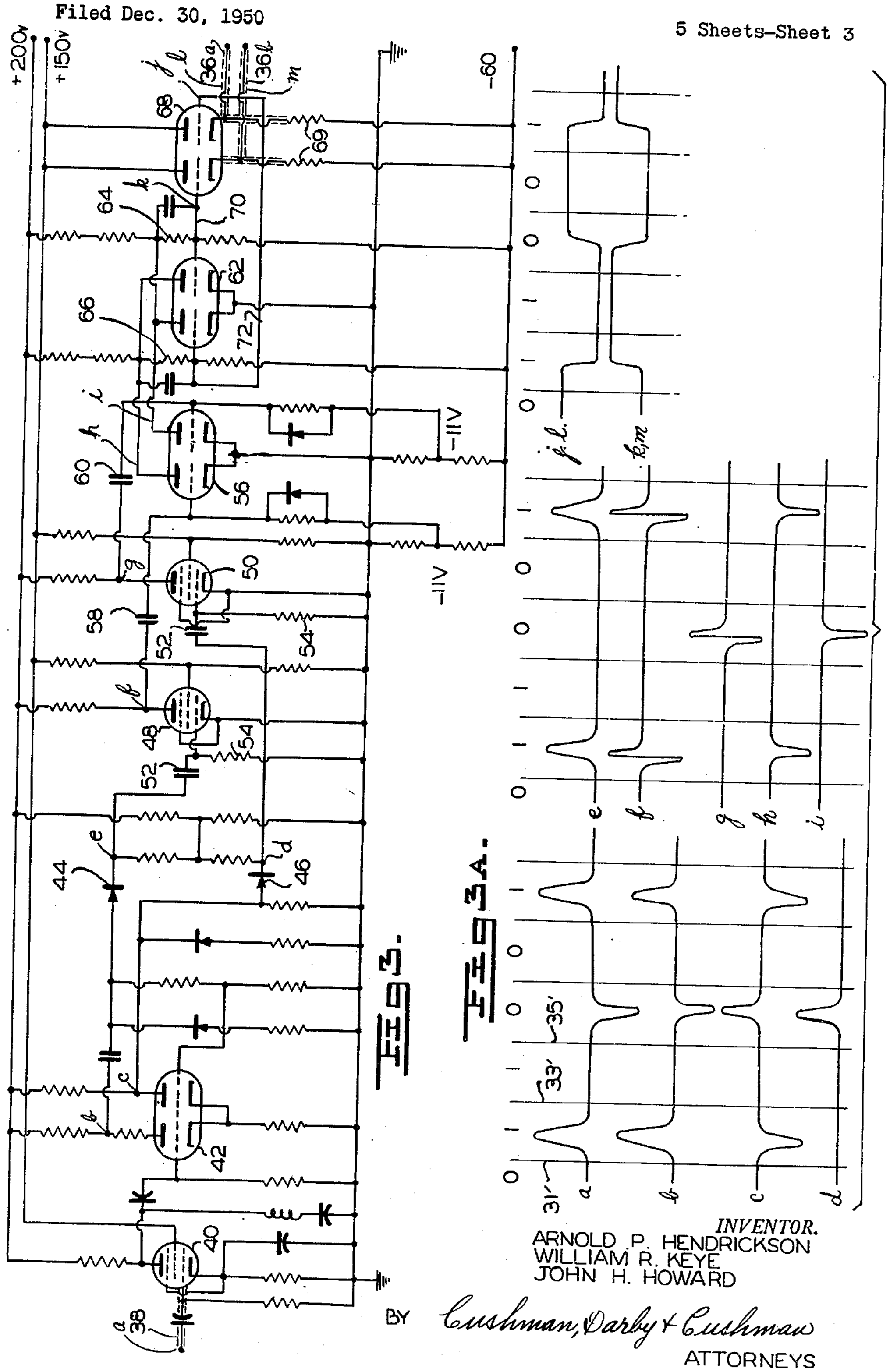
Figure 3 is a schematic diagram of a reading amplifier employed in the invention.
Figure 3A is a chart of voltage patterns obtained in the use of the circuit of Figure 3.

The details of a suitable circuit for the reading amplifiers 36 is shown in Figure 3. This amplifier is one intended for use with non-return-to-zero signals in the locator tracks of section A of drum 10. That is, the indicium or flux in adjacent cells in each track such as T will blend into a substantially continuous flux and which flux will be unidirectional except for changes between 0's and 1's or vice versa. This technique is described in detail in said Cohen et al. application, Serial No. 16,998. An illustrative series of binary cells is shown on the drum 10 of Figure 1 in the track T′ of section A. This track, beginning at the cells in the row 30, carries a 0 followed by two 1's, two 0's and a 1. This is the usual progression of the next to the end column of a binary numbering system.

The voltage produced by the transducer 28 aligned with track T′ accordingly will be substantially of the form indicated by the pattern *a* of Figure 3A. In Figure 3A the vertical lines 31′, 33′ and 35′ respectively correspond to the cells separating lines 31, 33 and 35 of Figure 1. Hence, the pattern *a* of Figure 3A corresponds to the signals or flux which extend vertically in track T′ of Figure 1. For example, when read downwardly, track T′ of Figure 1 reads 011001, the same reading which is obtained by a left to right reading of pattern *a* of Figure 3A. Accordingly, in Figure 3A, the first 1 (the Track T′ cell in row 32) appearing after the 0 (the track T′ cell in row 30) means that the transducer 28 will detect the change of flux from one direction to the other, and this change will generate the first positive pulse shown in pattern *a* of Figure 3A. The next cell in track T′ reads "1" and no change occurs. However, the fourth cell in track T′ reads "0" and the flux accordingly changes to the opposite direction and produces a negative pulse, as shown in pattern *a* of Figure 3A. Continuing the analysis, since the next cell in track T′ reads "0" there is no change, but the next cell in track T′ reads "1" and a second positive pulse is developed, as shown in pattern *a* of Figure 3A.

While the track T′ of Figure 1 has been selected as an illustration, it will be understood that each track of address section A carries a series of 1's and 0's depending on the particular binary combinations appearing in horizontal rows such as 30, 32, 34, etc. of the drum.

Referring again to the amplifier of Figure 3, the patterns *a* to *m* of Figure 3A show wave forms appearing at the correspondingly lettered points in the circuit of Figure 3. For example, pattern *a* is the voltage representative of 011001 on lead 38. This voltage on lead 38 is first amplified at tube 40 and in the left hand portion of tube 42 with the wave of pattern *b* obtained in the anode circuit of this tube. (The showing of some tubes as dual tubes is for convenience only and is not necessary.) The wave of pattern *b* is then applied in part to the right hand side of tube 42 to obtain an inverted companion wave *c* for purposes which will become clear. The waves *b* and *c* are then processed through rectifiers 44 and 46, respectively, with wave forms *e* and *d* appearing at the right hand sides of these rectifiers. Comparison of these wave forms shows that only the positive waves of *b* and *c* are transmitted. These positive waves are respectively applied to tubes 48 and 50 and waves *f* and *g* obtained in the anode circuit of these tubes. Inspection of waves *f* and *g* shows that they are amplified and inverted time derivatives of the waves *c* and *e*, this coming about because of a small RC value of the capacitive-resistive combination 52, 54 connected in the grid circuits of the tubes 48 and 50.

The waves *f* and *g* are then applied to a dual triode 56 through condensers 58 and 60. The indicated bias between the cathodes and grids of tube 56 permits the anode potentials to swing only in response to positive excursions of the grids, and this action, accordingly, because of the 180° inversion in the tube 56, will permit the anode potentials *h* and *i* to take only a negative swing.

The leads carrrying *h* and *i* are each connected to a separate load resistor and also to one of the anodes of a dual tube 62 which has its anodes and grids cross-connected through resistors 64 and 66. The tube 62 is therefore connected in a conventional flip-flop circuit which will shift its conductive condition according to the pulses *h* and *i*. The differentiation in the circuit causes waves *h* and *i* to have steeply rising wave fronts which coincide very nearly with the peaks of the original signals. Accordingly, the flip-flop transition occurs essentially at the peak of the original signal, which is an advantage over having the transition dependent solely on the amplitude of the original signal.

The respective anodes of the tube 62 are connected to a dual tube 68, and both sides of this tube are connected in a cathode follower circuit. The connection from the anodes of tube 62 to the grids of the tube 68 are through the previously mentioned resistors 64 and 66 and through the lines 70 and 72, respectively. With the arrangement as described, a pulse *h* will shift conduction to the right side of tube 62 and *j* will drop to cut off the right side of tube 68. At the same time, the left side of tube 62 will cut off and *k* will rise to cause the left side of tube 68 to conduct. Accordingly, *l* and *m* will swing because of the cathode-follower resistors 69.

It will now be clear that, assuming the flip-flop tube 62 to be in one state of conduction, the right hand side of tube 68 will be substantially cut off and the voltage on line 36*a* will be at a relatively negative voltage (−30 volts, for example). But during the time that the voltage on line 36*a* is at the negative voltage, for the reasons stated, the voltage on the line 36*b* will be at a more positive point because of the fact that the flip-flop tube 62 causes the grid of the left hand side of tube 68 to be at a relatively positive potential, thus permitting conduction through the left hand side of tube 68. The result of the foregoing is that when the first 1 appears of after a 0, as in rows 30 and 32 of track T′, a pulse will appear on the left hand anode of tube 56 which will shift the flip-flop 62 so that the voltage on line 36*a* moves from a relatively positive voltage (0 volt, as an example) to the negative voltage (−30 volts), and the voltage on line 36*b* moves positive from the negative voltage. This situation continues to exist as a series of 1′s passes beneath the transducer 28, but the situation changes to its former status when the next 0 is read by the transducer 28.

The net result of the action of the amplifier 36 of Figure 3 is that there is available on the line 36*a* or 36*b* a choice of two different reference voltages, this choice existing whether a 0 or a 1 is being read by the transducer 28.

The reference voltages derived from the reading amplifiers 36 are made available at terminals in an address register designated as 110 in Figure 1. In its simplest form, this register may be an arrangement of N switches which may be moved between two possible positions. The common point of each of these switches is then connected through lines 112 to a coincidence detector circuit designated as 114 in Figure 1. The function of the circuit 114 is to detect a coindidence of like voltages of the lines 112 and produce an output pulse only when such coincidence occurs. The details of the coincidence circuit 114 may be understood with reference to Figure 4.

Figure 4:
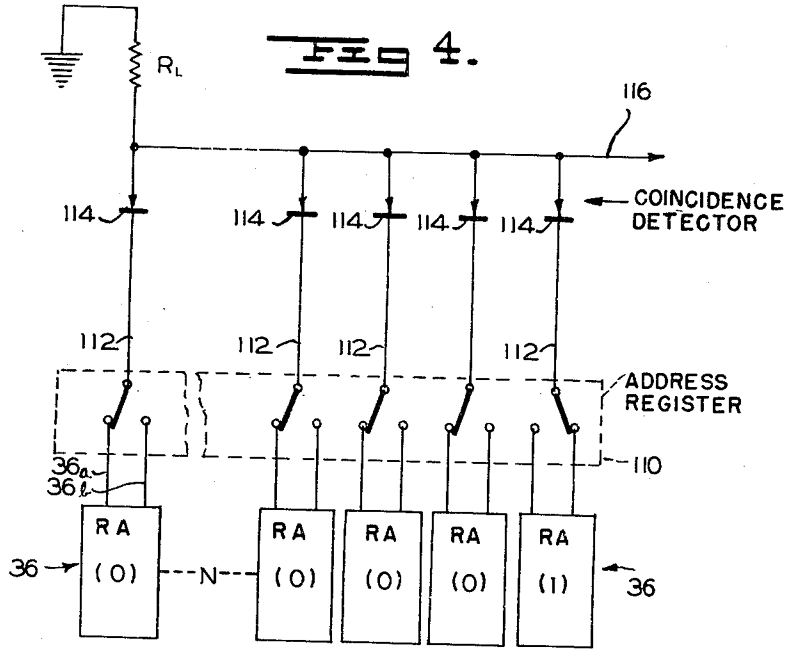
Figure 4 shows a coincidence detector circuit employed in the invention.

In Figure 4, the address register 110 and the reading amplifiers 36 are again indicated for ease in comprehending the arrangement. The layout of the reading amplifiers 36 from right to left is the same in both Figures 1 and 4. The coincidence circuit itself may consist of N electronic elements which will conduct when properly biased. These may be crystal diodes of the 1N38 variety. The use of 1N38's is illustrated. One side of each of the N elements 114 is interconnected with the corresponding side of each of the other elements and these are connected through a common load resistance $R_L$ to ground. The other side of each of the elements is connected through the previously mentioned lines 112 to the common point of the switches in the address register 110. The interconnection between the load resistance $R_L$ and the stated one side of the elements 114 is also connected to an outgoing line 116 for a purpose to be explained.

The circuit of Figure 4 as thus far described will be recognized as a variation of the well-known Rossi coincidence circuit, and it will be understood that if any one or more of the elements 114 is so biased that it will conduct, then there will be a resulting voltage drop across the load resistance $R_L$ and the potential on line 116 will remain substantially the same. That is, no matter if one, two, or all of the N elements 114 are conducting, the potential on line 116 will be maintained within a limited range. However, if all of the lines 112 are connected to a reference potential which will serve to cut off each of the elemens 114 at the same time, then the current through the load resistance $R_L$ will cease and the potential on line 116 will take a positive swing.

Accordingly, the switches of the address register 110 may be so set with relation to the lines 36*a* and 36*b* of each of the reading amplifiers 36 that a cut-off bias appears on each line 112. Therefore, an output pulse can be obtained for one and only one of the rows of section B of the drum. However, if any address number is repeated in section A, a coincidence pulse will be obtained in each instance. It is in this manner that the novel location technique of this invention is carried out.

By way of additional clarification, the operation of the apparatus may be traced as follows: Assuming that the row 30 is to be located, the setting of the switches of register 110 to provide concurrent cut-off voltages on all of the N lines 112 is all that is necessary. It has previously been described how the line 36*a* may carry zero volts and line 36*b* carry −30 volts when 0's are passing under the connected transducers. Therefore, if the switches of register 110 are set to line 36*a* for 0's and to 36*b* for 1's, an output pulse will be obtained on the line 116. This follows from the fact that the elements 114 are cut off in the absence of a negative bias on lines 112. As an example, Figure 1 shows that the row 30 contains (reading left to right 0—0001). Accordingly, the Nth switch and the next three following switches (reading left to right in Figures 1 and 4) of address register 110 should be set to the 36*a* lines, the right hand switch should be set to the 36*b* line. By this means, all of the lines 112 will be at zero volts simultaneously with the passing of row 30 adjacent the transducer 28, and an output pulse obtained on line 116. Since there is no other binary number in any other row of the drum which is the same as the binary number in row 30, an output pulse will be obtained only when row 30 is read. In each of the other rows, there will be at least one signal which will bias one of the elements 114 to conduct, and therefore maintain the potential on line 116 within its normal limitations.

Figure 5:
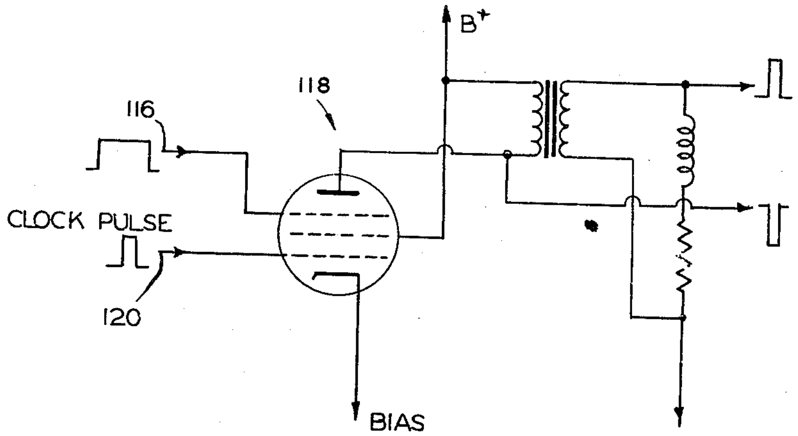
Figure 5 shows a gate circuit employed in the invention.

It is usually the case that the potential swing on the line 116 takes the form of a rather broad pulse which persists for the major part of the time during which a cell is passing adjacent its transducer 28. Since it is not particularly desirable to employ such a pulse in the triggering of associated circuits, this pulse on line 116 may be used to enable a gate circuit and the second input of the gate may be connected with the clock pulse line 21. This arrangement is shown in Figure 1, wherein gate circuit 118 has one input through line 116 and a second input through line 120, the latter being connected to line 21. Suitable gate circuits are well-known, and it is believed sufficient in this application to illustrate a suitable gate, as in Figure 5. The illustrated circuit has suitable connection for producing both a positive and a negative pulse upon the simultaneous existence of the pulse on line 116 and the clock pulse on line 120. The result of the inclusion of gate 118 in the circuit is that on each revolution of drum 10 there will be, in effect, the transmission of but a single clock pulse, and this clock pulse is the one which is synchronized with the row 30 of section A of the drum.

When it is desired to obtain a gated clock pulse through gate 118 which corresponds with the row 32, then the switches 110 of the address register must be set to correspond with the binary address in the cells of row 32 and similarly for row 34 and the other rows of the drum.

The use of the remainder of drum 10 under the control of gated clock pulses from section A of the drum will now be explained. The remainder of drum 10 is designated as section B in Figure 1 and this section may contain X tracks having X combined reading-writing transducers 210 positioned to cooperate with these tracks. In Figure 1, X tracks are diagrammatically indicated by two transducers 210, but only the right hand one of these transducers is shown connected to associated circuits. It will be understood from the previously-mentioned patent applications that in general the associated circuits will be duplicated for each of the X transducers 210.

Assuming first, for the sake of explanation, that each of the cells of the tracks in section B of the drum previously has had recorded therein a 1 or a 0, it immediately will be clear that the associated scanning transducer 210 is continuously reading these binary notations as the drum revolves. These reading voltages will be available on line 212 and thereby may be applied as an input to a reading amplifier 214. In the event that the cells on the track are of the non-return-to-zero type, the reading amplifier 214 may be the same as the amplifiers 36 illustrated in Figure 3. However, in this case, it will be necessary only to use either the output line 36*a* or 36*b*. Whichever of these lines is selected, it will be connected to line 216 and this line may serve as one of two inputs to a gate circuit 218. The other input of the gate 218 may be provided through the line 220 which may carry either the continuous stream of clock pulses available on the line 21, or may carry gated clock pulses available at the output of gate 118. This output is designated as line 221.

It may be preferable to apply either the gated clock pulse or the train of clock pulses to the line 220 through a fixed delay circuit 222, the purpose of which will be explained below.

Selection between line 21 and line 221 may be obtained through a switch 224, and this switch may include an open position to completely isolate the line 220 if desired. The gate 218 may be the same as the gate 118.

The output of gate 218 is produced on line 226 and this may be connected to a control or indicator unit designated as 228. In practice, the unit 228 actually may comprise a stage of a computing machine or the like, but for purposes of illustration, it may be considered as simply a cathode ray oscilloscope. As an example of the use of an oscilloscope at 228 to read the cells on a track by means of the transducer 210, the switch 224 may be thrown to contact line 21 directly. The complete train of clock pulses will then be available on line 220 and each clock pulse will open the gate 218 and permit the line 226 to produce a deflection in the cathode ray tube which will indicate the nature of the flux in each cell. That is, according to the line 36*a* or 36*b* connected to the gate 218, the gate will open or will close during the clock pulses on line 220. It will be understood that the gate 218 must be suitably biased to cooperate with the particular cathode follower voltages supplied from reading amplifier 214. The sweep of the cathode ray tube may be synchronized with the drum movement in any convenient fashion, such as using a spare track to produce a sweep triggering signal.

If it is desired to read the flux in a single selected cell, which would be the equivalent of producing a signal from a preselected cell or cells into a computing machine or the like through unit 228, the switch 224 may be thrown to contact the line 221. Accordingly, only a single gated clock pulse will be available on line 220, this gated clock pulse indicating a cell in the tracks of section B which corresponds to the preselected address in section A of the drum.

If the flux cells in the section B tracks are of the discrete or return-to-zero type, then the reading amplifier 214 may be of the type employed in the previously mentioned Cohen et al. application, Serial No. 175,832.

Figure 6:
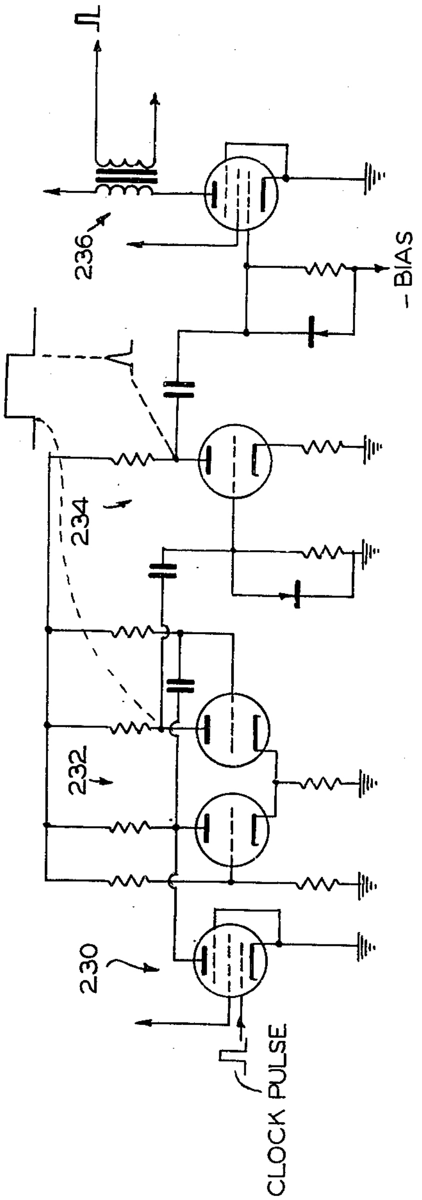
Figure 6 shows a delay circuit employed in the invention.

The function of the delay circuit 222 is to delay the clock pulses applied to the line 220. This delay has been found to give an improved reading when the same clock pulses previously have been employed to cause a writing action through the transducer 210. A suitable delay circuit is shown in Figure 6. The clock pulses entering this circuit are first applied to an amplifying section 230 and then into a delay multivibrator section 232. The reversion of the multivibrator to its original state at the end of its cycle generates a transition pulse which is inverted in section 234 and then amplified in section 236 to produce a positive output pulse. The delay period will be correlated with the drum speed, for example, at usual drum speeds, the delay period may be approximately four microseconds.

It will also be apparent that an additional timing track and/or timing magnet can be employed to generate "displaced" pulses and thus serve the purpose of the just mentioned delay.

Figure 7:
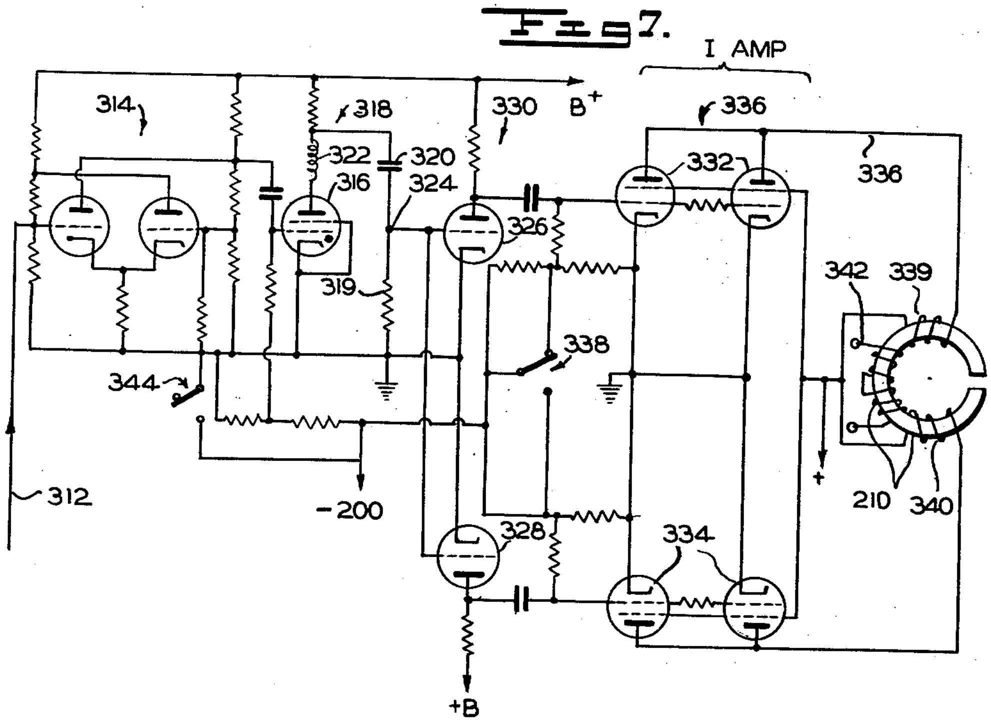
Figure 7 is a pulse writing circuit employed in the invention.

As previously suggested, the clock pulses may be employed to trigger a writing circuit 310 which will write a 1 or a 0 into preselected cells of the tracks of section B. The circuit 310 is supplied with clock pulses through line 312 extending from the switch 224. A suitable circuit for writing is shown in Figure 7. In this circuit a clock pulse appearing on line 312 is first employed to trigger a flip-flop section 314. The transition of the flip-flop 314 triggers gas filled tube 316 in pulse forming section 318 to cause a condenser 320 in RLC circuit 319, 320, 322 to discharge. This discharge is in a manner to cause the voltage across resistor 319 to follow substantially a single half sine wave. The resulting potential swing at point 324 of pulse forming section 318 is then simultaneously applied to the grids of tubes 326 and 328 in voltage amplifying section 330. The anode of each of the tubes 326 and 328 is then coupled to the control grids of pairs of parallel connected tubes 332 and 334 in current amplifying section 336. The bias of tubes 332 and 334 is selectively determined by a switch 338 movable between two positions. This is the switch also shown in Figure 1 connected to writing circuit 310. When the switch 338 is in the lower or 0 position, then only the tubes 332 will be properly biased for conduction when an output pulse appears at the anodes of tubes 326 and 328. Accordingly, current will flow only through the line 336 connected to the anodes of tubes 332 and will energize only the windings 339 of the transducing head 210. If the switch 338 is thrown to the upper or 1 position, the above situation will be reversed and only the tubes 334 will cause current to flow through the winding 340. Both windings conduct no current in absence of a pulse across resistor 319. The windings 339 and 340 are wound so that current flows in opposite directions and, therefore, the flux induced in the magnetic medium obviously will be in opposite directions for the two positions of the switch 338.

The reading line 212 terminates in the transducer 210 at reading coil 342.

The flip-flop section 314 of the circuit of Figure 7 is equipped with a reset switch 344. This switch may be momentarily engaged with a negative voltage to reset the flip-flop so that a clock pulse will again cause a transition to trigger the pulse forming circuit 318.

The nature of the writing process for selective alteration, particularly in the case of non-return-to-zero procedure, requires a writing signal current of short duration, which may possess symmetry about the peak value. The half sine wave shape is used because this appears to be the most easily attainable signal having these properties. For non-return-to-zero alteration, the pulses will be of sufficient duration to extend the length of the cells and therefore blend in adjacent cells to form a continuous flux pattern.

The writing circuit shown in Figure 7 will have a definite recovery time, since the recharging time of the pulse-forming network has a lower limit determined by the deionization time of the thyratron. The circuit as shown probably will not write two pulses in succession which are separated by less than several hundred microseconds. This would not be a serious limitation in most magnetic storage systems, since with selective alteration it should not be necessary to write successively into adjacent cells. However, in any application requiring more rapid recovery, other means of pulse forming may be used which do not employ gas tubes.

Since the writing circuit 310 is connected through line 312 directly to the switch 224, the writing will be instigated immediately upon the occurrence of the gated clock pulse on line 221. Accordingly, the cell which is established to compare with the row 30 of section A, for example, will be located a short distance behind the row 30. That is, the cell will be of substantially the same width as the cells in section A but will not begin until the flux in row 30 has had an opportunity to be read in the transducers 28 and have produced a gated clock pulse. Accordingly, since it is most desirable to gate the reading pulse substantially at the center of the latter, the delay 222 is employed to delay the clock pulses used for reading on line 220 so that the gate 218 opens a few microseconds late.

Figure 8:
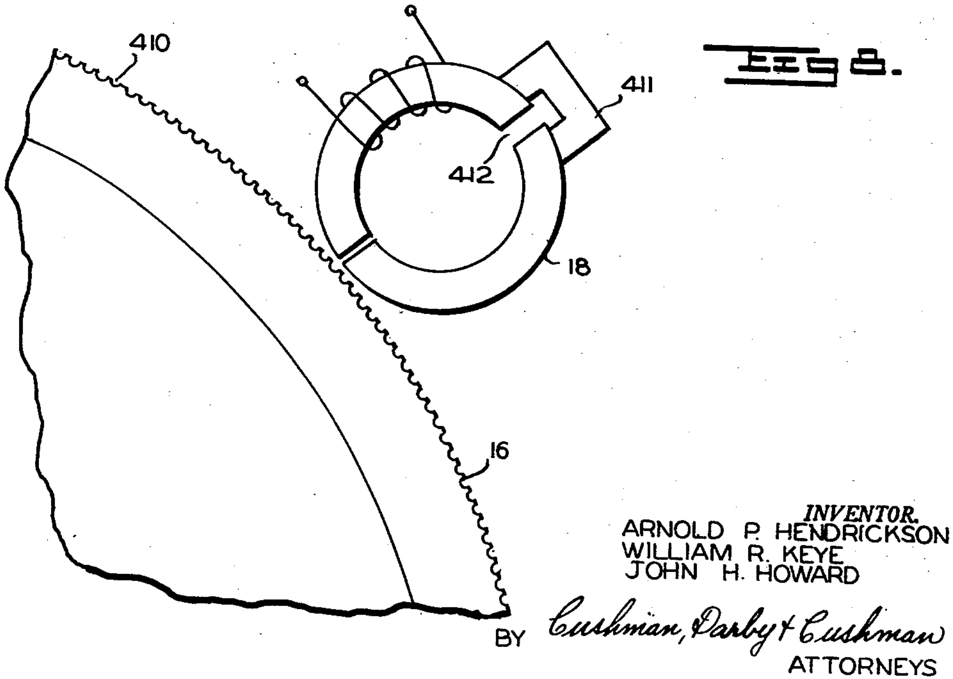
Figure 8 shows a milled timing track which may be employed in the invention.

Figure 8 shows an enlarged section of a soft iron milled timing track cooperating with the timing track transducer 18. As the milled grooves 410 pass the head 18 they cause the reluctance of the head to vary and produce signals in the head winding. A permanent magnet 411 is provided across a gap 412 to create a bias flux in the head 18.

Throughout this specification it will be understood that the rows of drum 10, that is, the diagrammed rows 30, 32 and 34, need not extend in a line parallel to the axis of the drum. While physical alignment has been illustrated and employed for purposes of discussion, it will be apparent that the electrical interconnection of the transducers will permit their actual location at any point of the drum. The only actual requirement of physical position is that the transducers sweep out tracks which do not overlap other tracks.

Methods and apparatus for originally recording the binary coded address flux in the tracks of section A of the drum have not been described in this specification because they form no particular part of the invention which is claimed. Normally, the address tracks will not be altered. However, it will be understood that the cells of these tracks may undergo recording and selective alteration just as do the cells in the tracks of section B. The only particular requirements of recording and selectively altering the coded address cells in section A is that they must be properly orientated with respect to the timing track 16 and any previously recorded cells in the tracks of section B which are to be retained. That is, it has previously been explained that a coincidence pulse on line 116 as gated by 118 will occur at least a minimum time after the cells of the selected row of section A have begun to pass under the transducers 28. Normally, in fact, a gated coincidence or clock pulse on line 221 will not be available until the selected row of section A is centered beneath the transducers 28. Accordingly, where this gated pulse is employed to write in a cell of section B through transducer 210, this cell will not begin until this moment. Accordingly, the cells in section B tracks will lag the section A cells by substantially half a cell length. It follows that a cell in the tracks of section A cannot be altered by simply connecting the writing circuit 310 to one of the transducers 28. On the contrary, the tracks of section A must be altered under the control of a gated clock pulse which occurs some portion of a cell period early. However, this easily can be accomplished by having an auxiliary timing track and associated tranducer available which is so adjusted and arranged as to produce gated clock pulses the necessary distance in advance of the clock pulses on line 20.

In the foregoing description the successive addresses are in adjacent rows of cells. That is, as illustrated on the drum in Figure 1, each binary number is one higher than the next. However, it will be possible to space successive addresses (and associated information in the information tracks) several rows apart, so that in installations of the drum involving sequence operated equipment the sequence circuits may have time to operate between successive items and yet a complete drum revolution will not intervene. Such a technique may be termed interlace.

It will be understood that the foregoing detailed description has been made only for purposes of illustration and is not intended to limit the scope of the invention. The scope of the invention is to be determined from the appended claim.

We claim:

In data storage apparatus, a record member, magnetic transducer locator scanning means positioned to scan a plurality of magnetizable locator tracks along the record member, means for imparting relative movement between the member and said scanning means for causing said scanning, an area of the record member apart from the locator tracks for containing information, and means for locating predetermined points along said area for a transducing operation therein by an information scanning means, the locating means including coincidence detection means connected to said locator transducer means for comparing binary digital signals generated in said locator transducer means from binary digital signals recorded in said locator tracks with pre-set binary signals for generating an output signal upon occurrence of detection of coincidence between said generated and pre-set binary signals, the apparatus further including a timing transducer positioned to scan a timing track along the member, the timing transducer being responsive to uniformly arrayed repetitive timing indicia on the timing track for generating timing signals having predetermined time occurrence in relation to the positions of said binary digital signals recorded in said locator tracks, and means for gating out said output signals of said coincidence detection means only during the existence of a timing signal.

References Cited in the file of this patent

UNITED STATES PATENTS

| | | |
|---|---|---|
| 1,694,631 | Trojani | Dec. 11, 1928 |
| 2,124,906 | Bryce | July 26, 1938 |
| 2,282,072 | Maul | May 5, 1942 |
| 2,295,000 | Morse | Sept. 8, 1942 |
| 2,397,604 | Hartley et al. | Apr. 2, 1946 |
| 2,533,242 | Gridley | Dec. 12, 1950 |
| 2,540,654 | Cohen et al. | Feb. 6, 1951 |
| 2,564,403 | May | Aug. 14, 1951 |